United States Patent [19]

Stephenson

[11] Patent Number: 5,014,565
[45] Date of Patent: May 14, 1991

[54] VARIABLE RATIO TRANSMISSION

[75] Inventor: Peter Stephenson, 26 Laingsberg Road, Eastvale, Springs, Transvaal, South Africa

[73] Assignees: Peter Stephenson; Jacobus Swanepoel, South Africa

[21] Appl. No.: 385,421

[22] Filed: Jul. 27, 1989

[30] Foreign Application Priority Data

Jul. 27, 1988 [ZA] South Africa ................. 88/5485
Jul. 27, 1988 [ZA] South Africa ................. 88/5486

[51] Int. Cl.$^5$ ............................................. F16H 55/34
[52] U.S. Cl. ........................................ 74/190; 74/194; 74/216
[58] Field of Search ................. 74/190, 194, 196, 216

[56] References Cited

FOREIGN PATENT DOCUMENTS 36831 6/1973 Australia .
1093242 11/1967 United Kingdom ................ 74/194

*Primary Examiner*—Leslie A. Braun
*Assistant Examiner*—Scott Anchell

[57] ABSTRACT

A variable ratio transmission unit includes at least one first transmission element mounted for rotation about a first axis, and at least one second transmission element in contact with the first element and mounted for rotation about a second axis. The first and second axes define a predetermined angle with each other. The first transmission element is generally disc shaped, with a profiled contact face on one major surface thereof, and the second transmission element is generally cylindrical, with a complementary profiled contact face on its periphery. The second element is slidable axially along the second axis to vary the distance between the point of contact of the elements and the first axis, to vary the effective transmission ratio. The first and second elements are so profiled that the common tangent at the point of contact between the elements passes through the point of intersection of the first and second axes irrespective of the axial position of the second element, and relative movement between the elements is substantially rolling movement. The transmission unit finds application in a vehicle transmission, in which a pair of the units are combined with an auxiliary gearbox to provide a steplessly variable friction drive transmission.

15 Claims, 8 Drawing Sheets

VARIABLE RATIO TRANSMISSION

BACKGROUND OF THE INVENTION

This invention relates to a variable ratio transmission.

Various forms of variable ratio transmission exist. One simple form of such a transmission comprises a pair of discs which are mounted on parallel but displaced shafts and which have curved engaging faces. The shafts can be moved closer together or further apart, varying the point of contact between the discs. Theoretically, there is an infinitely thin pitch line on each disc which determines the ratio of transmission. In reality, the pitch line has a finite thickness, and contact between the discs takes place over a measurable area, rather than at a point. Accordingly, there cannot be true rolling contact between the discs, and some degree of slippage must occur, leading to heat buildup and wear. Apart from this, the sliding coefficient of friction between the discs is usually lower than the static co-efficient of friction, so that the torque which can be transmitted between the discs is reduced.

Transmissions such as that described above are generally restricted to use in low torque applications. Variable ratio transmissions for motor vehicles, for example, tend to be more complicated and may be relatively inefficient. For example, hydraulic torque converters used in motor vehicles dissipate a considerable amount of energy. Other forms of continuously variable transmission which have been proposed employ belts or chains which are driven by variable diameter pulleys. Such transmissions suffer from various practical problems which have limited their applicability to relatively low powered vehicles. The longevity of such systems is also suspect.

SUMMARY OF THE INVENTION

According to the invention a variable ratio transmission includes at least one first transmission element mounted for rotation about a first axis, and at least one second transmission element in contact with the first element and mounted for rotation about a second axis which defines a predetermined angle with the first axis, the second element being slidable axially along the second axis to vary the distance between the contact point between the elements and the first axis, thereby to vary the effective transmission ratio, the first and second elements being provided with complementary profiled faces so that the common tangent at the point of contact between the elements passes through the point of intersection of the first and second axes irrespective of the axial position of the second element, relative movement between the elements being essentially rolling movement.

Preferably, the first and second axes are orthogonal.

The first transmission element may be generally disc shaped, with a profiled contact face on one major surface thereof, the second transmission element being generally cylindrical and having a complementary profiled contact face on its periphery.

A plurality of second transmission elements may be disposed adjacent to the first transmission element and spaced radially about the first axis, each second element being in driving engagement with a common further transmission element.

A pair of first transmission elements may be disposed opposite one another, with the second transmission elements therebetween.

DESCRIPTION OF PREFERRED EMBODIMENT

Figure 1:
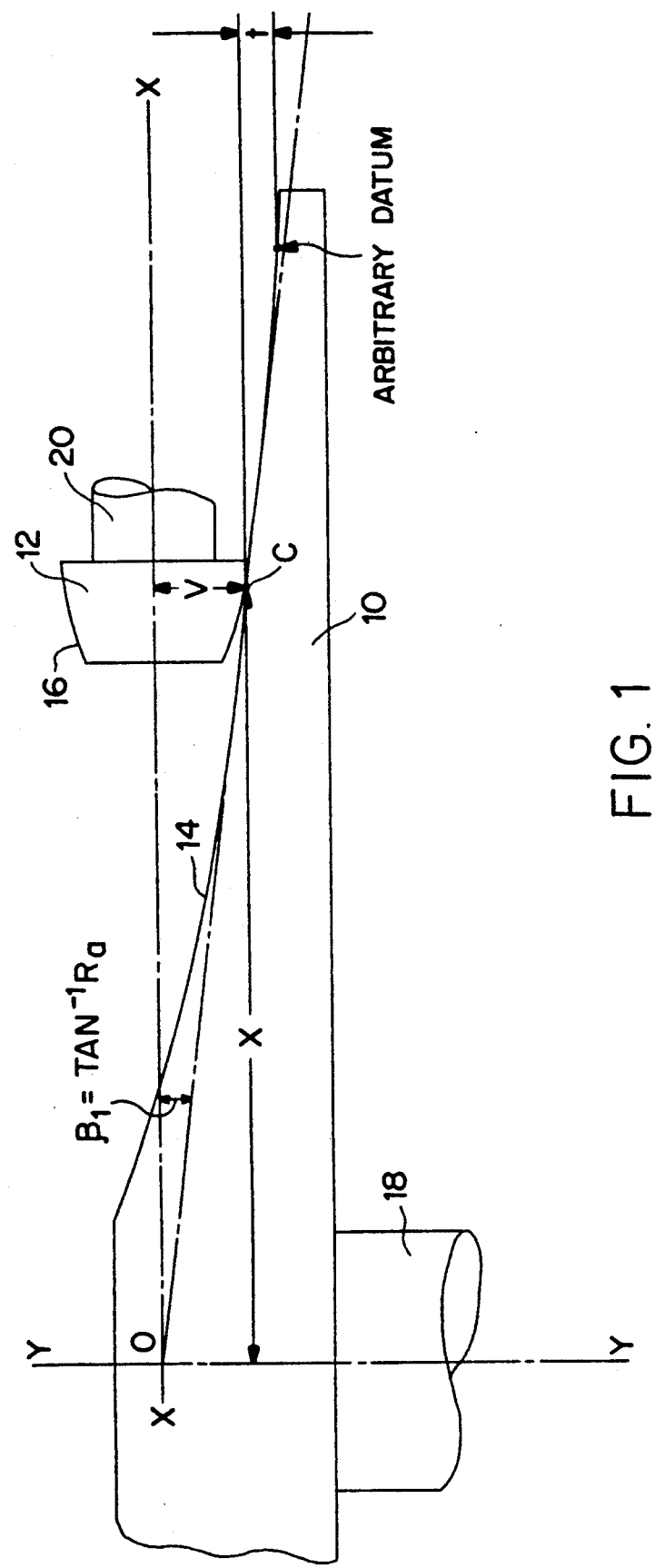
FIG. 1 illustrates, schematically, the engagement of first and second transmission elements according to the invention.

FIG. 1 shows a first transmission element 10 engaged with a second transmission element 12. The transmission element 10 is generally disc shaped and has a profiled contact face 14 formed on one major surface thereof which engages a complementary profiled face 16 formed on the periphery of the second transmission element 12, which is generally cylindrical. The transmission element 10 is mounted on a shaft 18, while the transmission element 12 is mounted on a shaft 20 which is orthogonal to the shaft 18. The transmission element 12 is slidable axially so that it makes contact with the element 10 at a point C at a variable distance X from the axis of the shaft 18.

It is intended that the second transmission element 12 serve as an input pinion, and that the transmission element 10 serve as an output gear. It will thus be appreciated that the illustrated transmission has a reduction ratio which will depend on the distance X of the contact point C from the axis Y-Y. If the respective profiles of the transmission elements 10 and 12 are selected so that pure rolling contact takes place between the elements, then the losses and wear associated with simple friction transmission systems can be avoided.

Figure 2:
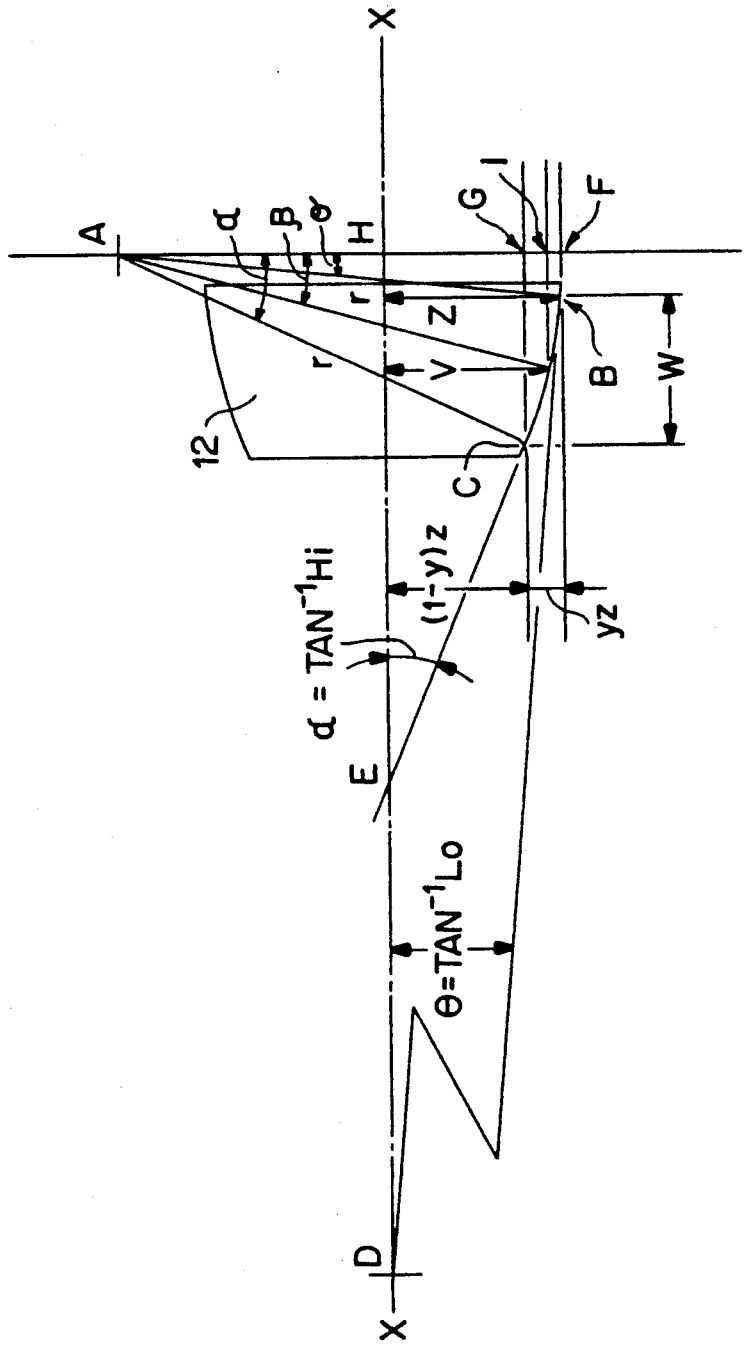
FIG. 2 is a schematic illustration of an input transmission element according to the invention.

Referring now to FIG. 2, the "low ratio" radius of the "input" transmission element 12 is defined as Z. If the allowed reduction in radius for the "high ratio" radius of the element is expressed as a factor of Z, say, y, then the dimensional reduction in radius is yz. Therefore the dimensional high ratio radius = minimum functional radius = $(1-y) Z$ Let low ratio=output revs/input revs=Lo then to satisfy the conditions for rolling contact, angle $BDH = \Theta = \tan^{-1} Lo$.

Let high ratio=output revs/inputs revs=Hi Then to satisfy the conditions for rolling contact, angle $CEH = \alpha = \tan^{-1} Hi$.

If a line CA is projected at right angles to the tangent EC, and a line BA is projected at right angles to the tangent DB to meet at A, both CA and BA are equal to the radius of curvature r. Angle BDH=angle BAF=$\Theta$ and angle CEH=angle CAG=$\alpha$.

$$\cos \Theta = \cos (\tan^{-1} Lo) = AF/r \qquad (3)$$
$$= \cos (\tan^{-1} Lo)$$

-continued and $\cos \alpha = AG/r$ $= \cos(\tan^{-1} Hi) = \dfrac{AF - yz}{r}$ (4)

from, $AF = r \cos(\tan^{-1} Lo)$ (3)

subs in (4): $\cos(\tan^{-1} Hi) = \dfrac{r \cos(\tan^{-1} Lo) - yz}{r}$ $\cos(\tan^{-1} Hi) = \cos(\tan^{-1} Lo) - \dfrac{yz}{r}$ $\dfrac{yz}{r} = \cos(\tan^{-1} Lo) - \cos(\tan^{-1} Hi)$ and $r = \dfrac{yz}{\cos(\tan^{-1} Lo) - \cos(\tan^{-1} Hi)}$ (5)

and $\omega = r[\sin(\tan^{-1} Hi) - \sin(\tan^{-1} Lo)]$ (6)

Thus if the following are known, then the functional profile of the input friction pinion can be fully specified.
(1) Maximum functional radius Z
(2) Radius reduction factor y
(3) Low ratio Lo
(4) High ratio Hi It will be apparent later that there are sensible parameters limiting the above input data.

As the input and output transmission elements are matched, much of the geometry of the output element 10 is a function of the corresponding geometry of the input element 12.

Thus for any ratio—Ra—from Lo to Hi (and slightly beyond for margins) there is a definite radius on the input element 12 which mates with a definite radius on the output element 10 at a contact angle which projects into the vertex of the axes.

It will be apparent that the ratio of transmission is always to be the tangent of the angle between the radius "r" drawn from the arc CB to A, and AH.

The radius "V" at which the input element makes contact for any ratio Ra is given by $V = Z - IF$
$= Z - [AF - AI]$
$= Z - AF + AI$
$= Z - r\cos\Theta + r\cos\beta$
$= Z + r\cos\beta - r\cos\Theta$
$= Z + r[\cos(\tan^{-1} Ra) - \cos(\tan^{-1} Lo)]$ (7)

The ratio of transmission $Ra = \dfrac{V}{x}$ and $x = \dfrac{V}{Ra}$ (see FIG. 1)

$x = \dfrac{Z + r[\cos(\tan^{-1} Ra) - \cos(\tan^{-1} Lo)]}{Ra}$ (8)

Now, consider what we know about any point on the functional profile of the gear:

for any ratio Ra we know (1) the angle between the x axis and the tangent at the contact point for pure rolling contact ($\tan^{-1} Ra$) and (2) the corresponding radius X (equation (8)).

Although this information specifies the profile, it cannot be plotted, drawn or manufactured without calculating relative heights such as 't'. (See FIG. 3).

From (8) we can readily calculate x for any value of Ra but the converse presents mathematical difficulties, so we make the mathematical statement as follows:

$Ra = \underset{Ra}{\text{solve}}\left[ \dfrac{Z + r[\cos(\tan^{-1} Ra) - \cos(\tan^{-1} Lo)]}{Ra} - X = 0 \right]$ (9)

In this form it can be solved by an iterative solve algorithm in a computer or calculator such as an HP 15 c manufactured by Hewlett Packard.

Figure 3:
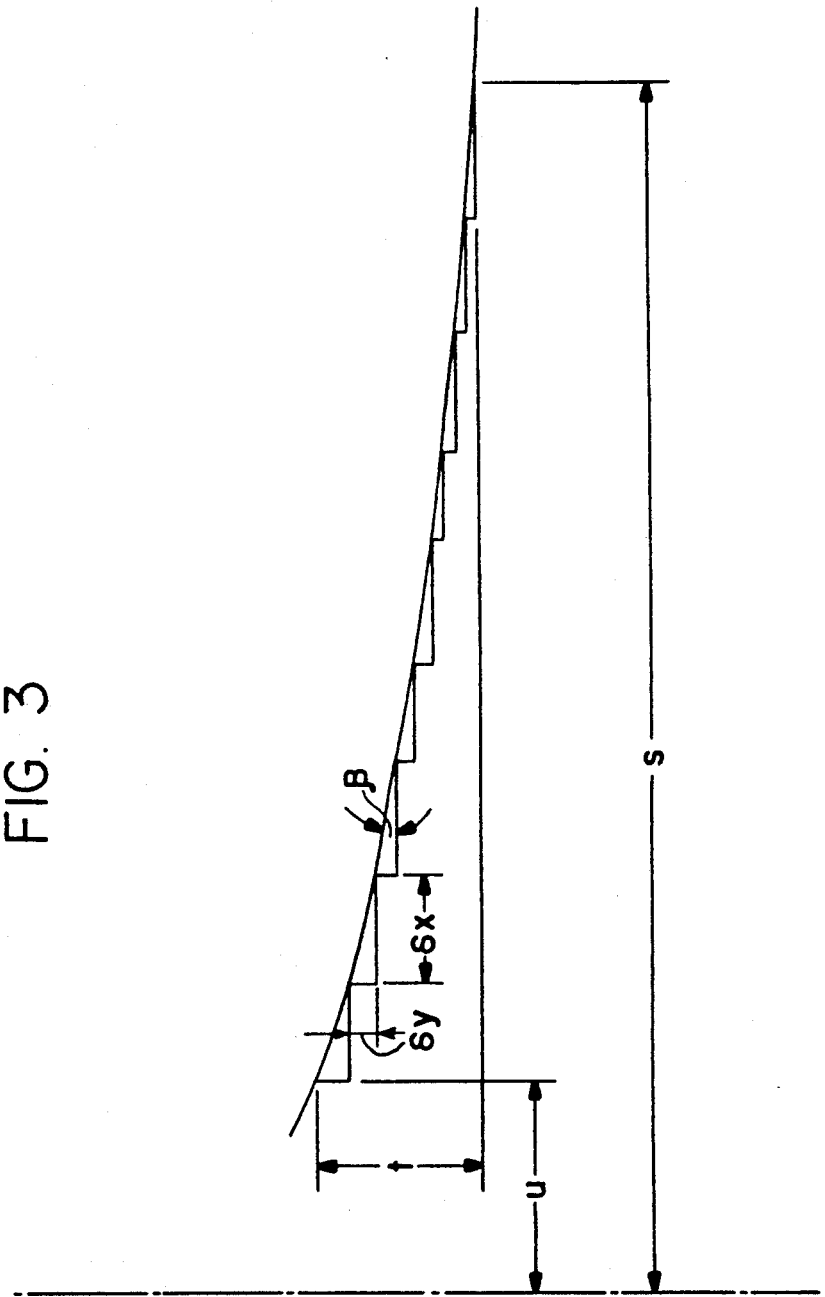
FIGS. 3 through 5 illustrate the calculation of suitable profiles for the transmission elements.

Referring to FIG. 3, the profile can be represented by a large number of small right angled triangles, each $\delta x$ wide. The difference in height, $\delta y$, is given by $\delta y = \tan\beta \, \delta x$
$= Ra \, \delta x$ and as $\delta x \to dx$, the height t, for values of x between u and s, becomes $t = \int_u^s Ra \, dx$ $= \int_u^s \underset{Ra}{\text{solve}}\left[ \dfrac{Z + r\cos(\tan^{-1} Ra) - \cos(\tan^{-1} Lo)}{Ra} - X = 0 \right] dx$ (10)

It is in most cases convenient to take "s", the upper limit of x, as being the radius corresponding to Lo. This then becomes the datum from which we calibrate all values of "t" for any specific value of u.

Figure 4:
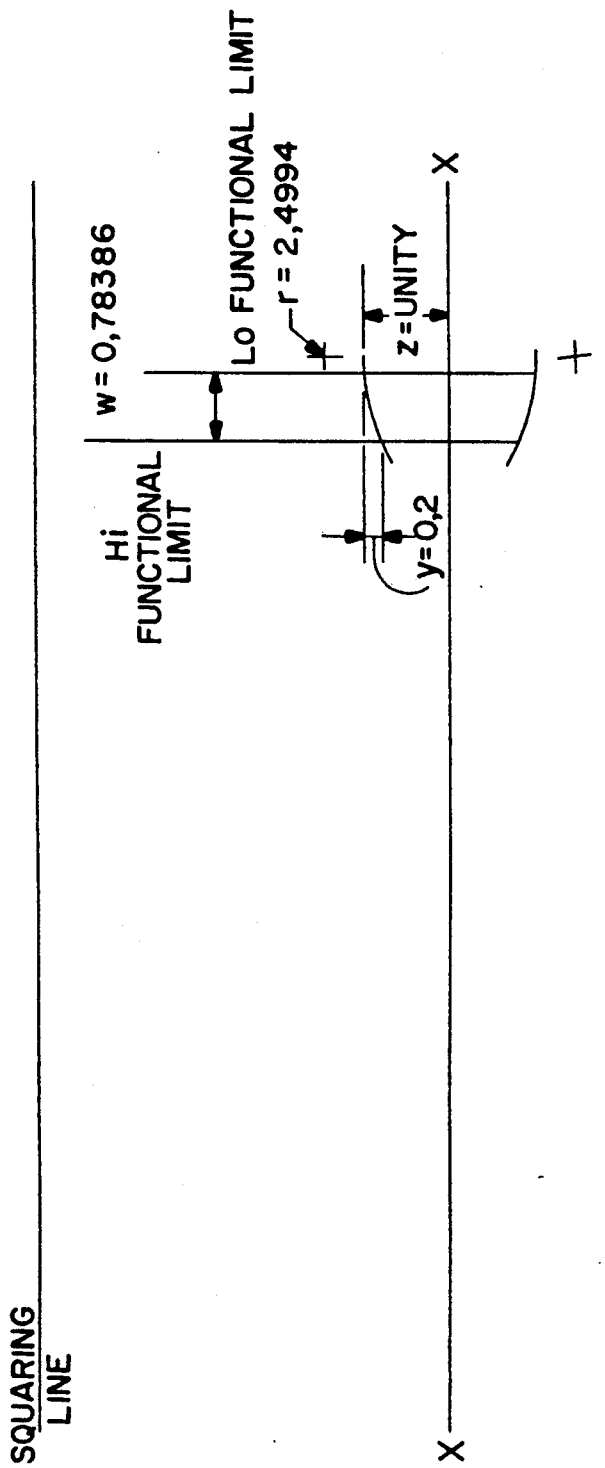
Figure 5:
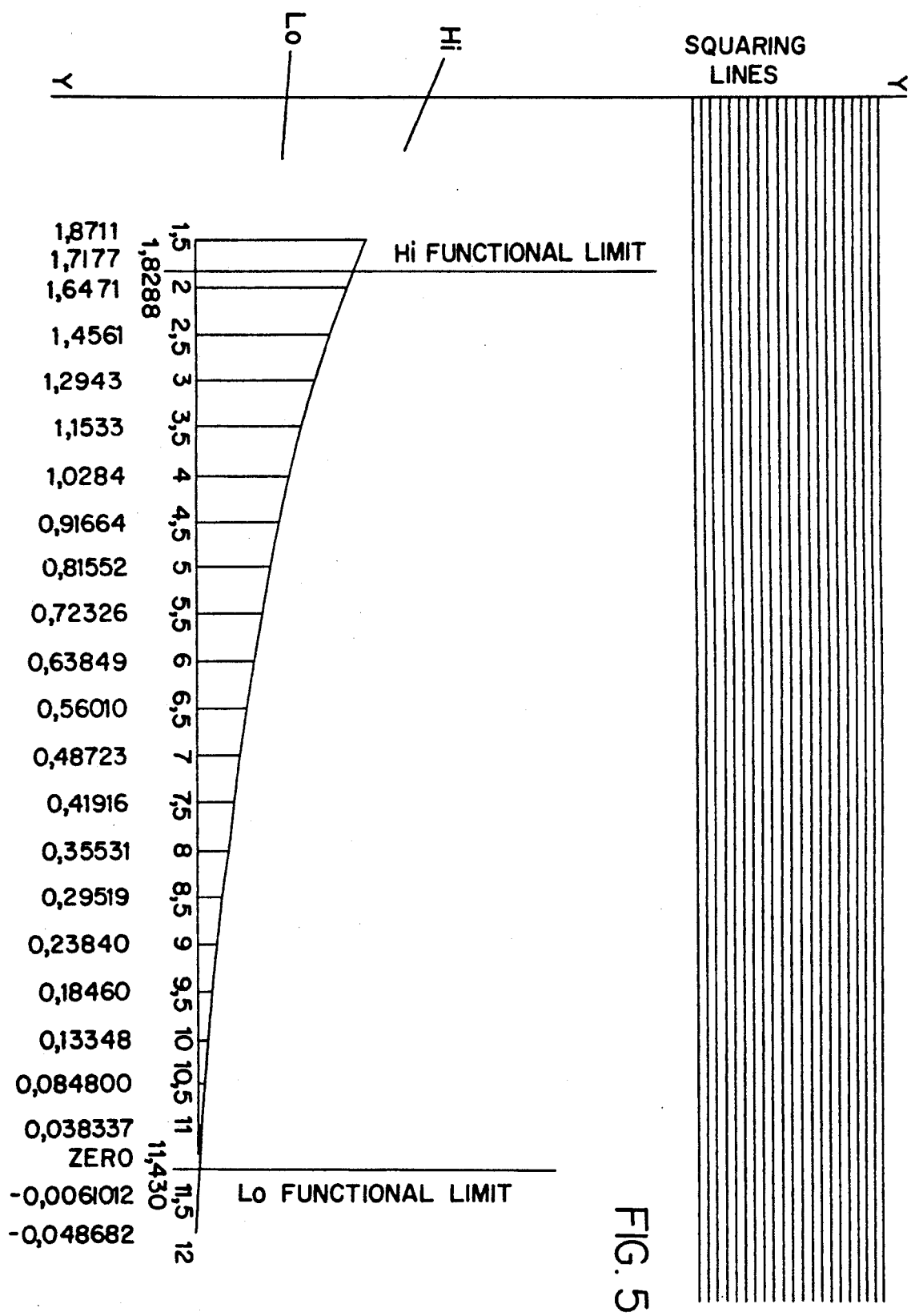

FIGS. 4 and 5 illustrate an example of the calculated profiles of an input transmission element 12 and an output transmission element 10, respectively. The profile of the transmission element 10 was calculated by means of a suitable computer program on a programmable calculator.

It can be shown that if the transmission elements 10 and 12 are engaged at any point on their respective contact faces, the common tangent at the contact point always projects into the point of intersection of the respective axes of the transmission elements. Thus, a transmission employing such elements can drive at any ratio between the design limits without overcoming friction at the contact point. In other words, a "pure" rolling contact exists. This allows a high effective coefficient of friction between the transmission elements, enabling a virtual positive drive ratio to be obtained.

Widening of the contact area at the contact point C does not give rise to frictional losses, unlike the prior art transmissions described earlier. Any contact point on the input transmission element 12 rolls onto a corresponding contact point on the transmission element 10, without sliding.

The gear ratio range of the described transmission system can be relatively high. For example, a ratio of 5:1 is possible. However, the size of the transmission elements may be limited by the speeds at which they are operated. Using transmission elements of hardened and ground steel, running with trace oil lubrication, rolling velocities of 30 to 50 m/s are possible. This places a constraint on the size of the elements, if hoop stresses in the elements are to be limited to an acceptable value.

Figure 6:
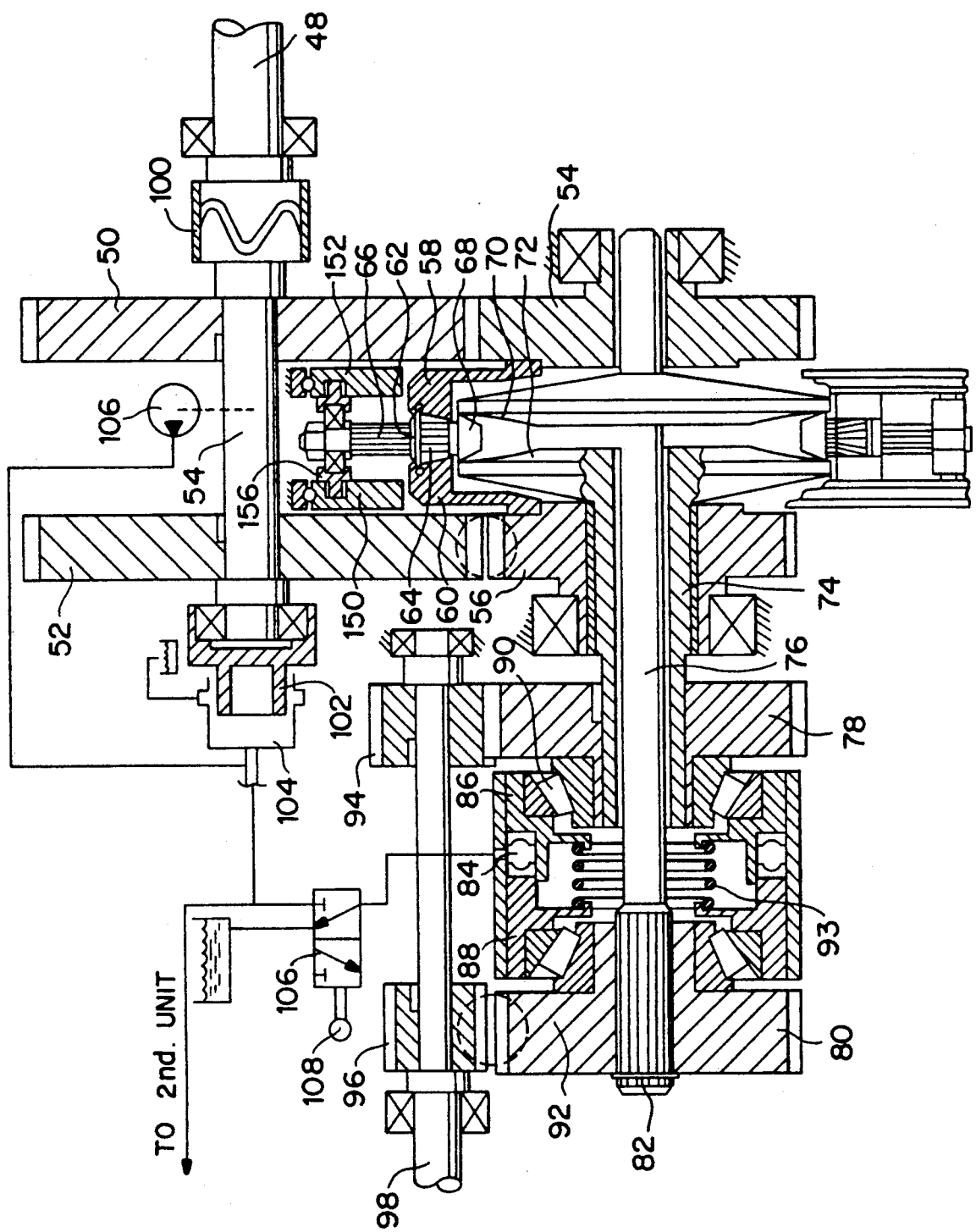
FIG. 6 illustrates schematically a prototype transmission unit according to the invention.

FIG. 6 is a schematic illustration of a practical transmission unit according to the invention. An input shaft 48 from a vehicle clutch (not shown) transmits drive torque to a pair of pinions 50 and 52, which are mounted on a common shaft 54. The pinions 50 and 52 drive further pinions 54 and 56, respectively, which are in turn connected to respective gallery gears 58 and 60. The gallery gears define annular ring gears 62 which face inwardly. A reversing idler (not shown) between the pinions 52 and 56 causes the gallery gear 60 to be driven in the opposite direction to the gallery gear 58.

The gallery gears 58 and 60 drive a set of twelve pinions 64 which are arranged radially about the central axis of the transmission. Each pinion 62 can slide on a splined shaft 66. Fixed to the inner end of each shaft 66 is an input transmission element 68, as described above, which is held in engagement with the profiled faces of a pair of output transmission elements 70 and 72. The transmission elements 70 and 72 have respective shafts 74 and 76, the shaft 74 being tubular and the shaft 76 being disposed coaxially therewithin. Respective pinions 78 and 80 are fixed to the shafts 74 and 76. The shaft 76 has a splined end 82 on which the pinion 80 is fixed. The shafts 74 and 76 are mounted to be axially slidable relative to one another under the urging of an annular hydraulic cylinder 84.

The cylinder 84 is double acting and comprises a pair of pistons 86 and 88 which apply axial force to the pinions 78 and 80, respectively, via respective tapered roller bearings 90 and 92. A compression coil spring 93 biases the pistons 86 and 88 apart.

Urging of the pinions 78 and 80 apart under the influence of the hydraulic cylinder 84 moves the shafts 74 and 76 relative to one another, to cause the output transmission elements 70 and 72 to be urged together. The degree of force generated by the hydraulic cylinder 84 is related to the input torque to the transmission unit applied via the shaft 48. A torque sensor 100 controls the operation of a hydraulic system which varies the pressure in the hydraulic cylinder 84 according to the magnitude of the input torque.

The torque sensor 100 comprises a coupling having two halves which are axially displacable relative to one another if the input torque applied to the coupling is great enough. When the input torque increases suddenly, the shaft 54 is forced axially away from the torque sensor 100 and pushes a piston 102 into a cylinder 104. The cylinder 104 is pressurized by a hydraulic pump 106 which is driven constantly by the shaft 54. Assuming that the transmission unit is on load, a load-/unload valve 106 connects the output of the cylinder 104 to the hydraulic cylinder 84, so that the input torque surge causes the transmission elements 70 and 72 to be urged more strongly together. The greater the input torque applied to the transmission unit, the greater is the force applied to the transmission elements 70 and 72, forcing them into contact with the input transmission elements 68. This ensures that positive drive is maintained irrespective of varying input torque. The load-/unload valve 106 is controlled by a cam 108 and switches the drive from the illustrated transmission unit to a second transmission unit (not shown) as required. Even when the load/unload valve has been operated to take the transmission unit off load, the compression spring 93 provides sufficient force to keep the input transmission element 68 and the output transmission elements 70, 72 in frictional contact.

The pinions 78 and 80 are connected via intervening pinions 94 and 96 to an output shaft 98 of the transmission. A reversing idler between the pinions 80 and 96 translates the drive from the counter-rotating shafts 74 and 76 into the same direction of rotation.

Figure 7:
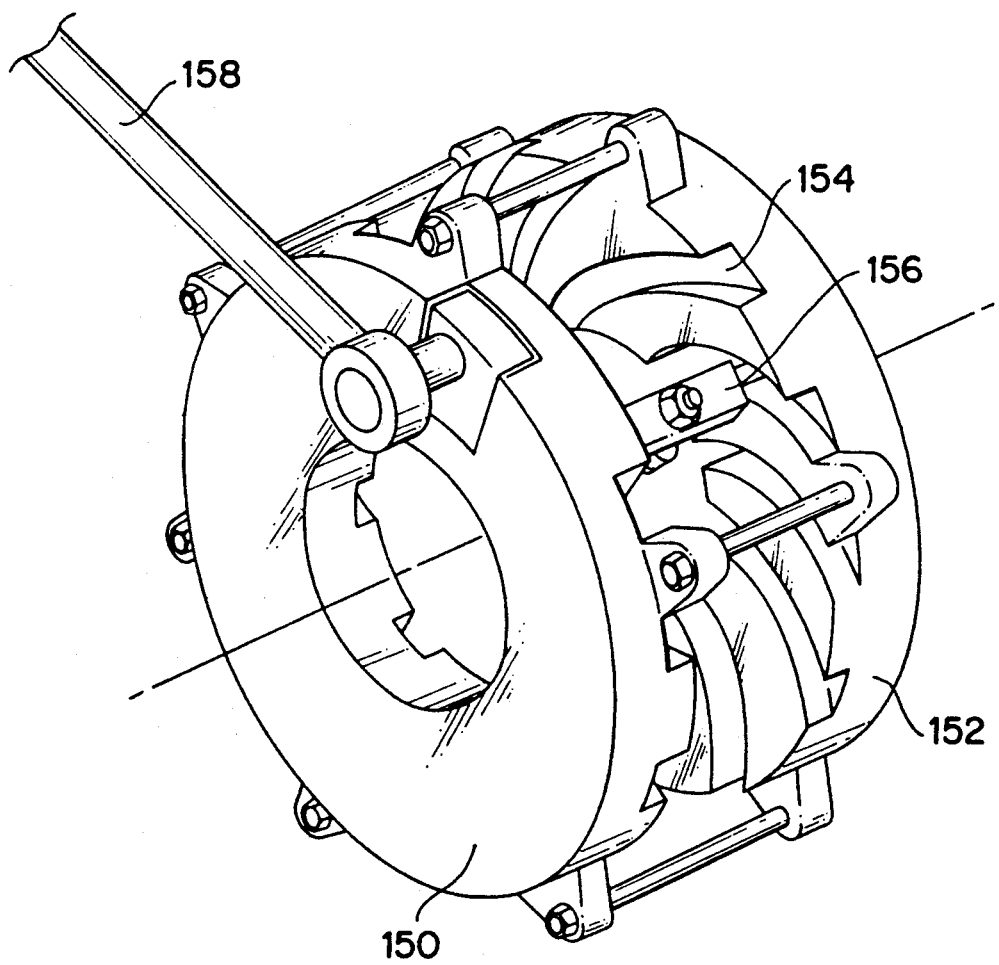
FIG. 7 illustrates a detail of the transmission unit of FIG. 6.

FIG. 7 illustrates a control mechanism which controls the radial positions of the transmission elements 68 relative to the axis of the transmission elements 70 and 72. The device essentially comprises a pair of iris cam elements 150 and 152 which take the form of annular elements arranged side by side, concentrically about the gallery gears 58 and 60, and having curved grooves 154 cut in their opposed inner faces. The grooves 154 receive respective ends of follower blocks 156 which are fitted to the end of each splined shaft 66, so that the follower blocks are slidable in the grooves. The iris cams are linked, and can be rotated about the axis of the output transmission elements 70 and 72 by a control rod 158. It will be apparent that rotation of the iris cams 150 and 152 with respect to the transmission unit will cause the follower blocks 156 to move radially inwardly or outwardly with respect to the main axis, thus causing the input transmission elements 68 to move radially inwardly or outwardly against the inner faces of the output transmission elements 70 and 72. This effectively varies the drive ratio of the transmission units.

The control rod 158 is actuated by a mechanism which can be hydraulically driven and which is, in turn, controlled by an external control system in accordance with predetermined operating parameters, as referred to below.

The described transmission unit is essentially a friction drive system, but does not suffer from the losses of known systems. Because of the number of input transmission elements (twelve), each of which drives two output elements, the transmission unit is capable of handling greater torques than simple systems. The complementary profiles of the input and output transmission elements allow the transmission ratio to be steplessly varied, on or off load.

The transmission ratio range of the above described transmission unit will typically be approximately 1,5:1, in a unit which can handle sufficient torque and operate at sufficiently high speeds for use in a motor vehicle. However, a typical motor vehicle transmission for use in a passenger vehicle with an internal combustion engine may require a transmission ratio range of from 4:1 to 5:1. It is thus necessary, in such applications, to provide an auxiliary transmission or gearbox which augments the transmission ratio range of the basic transmission unit. Advantageously, two transmission units are combined with an auxiliary transmission unit which connects the transmission units alternately in a "leap frog" manner, so that a steplessly variable transmission is effectively provided.

Figure 8:
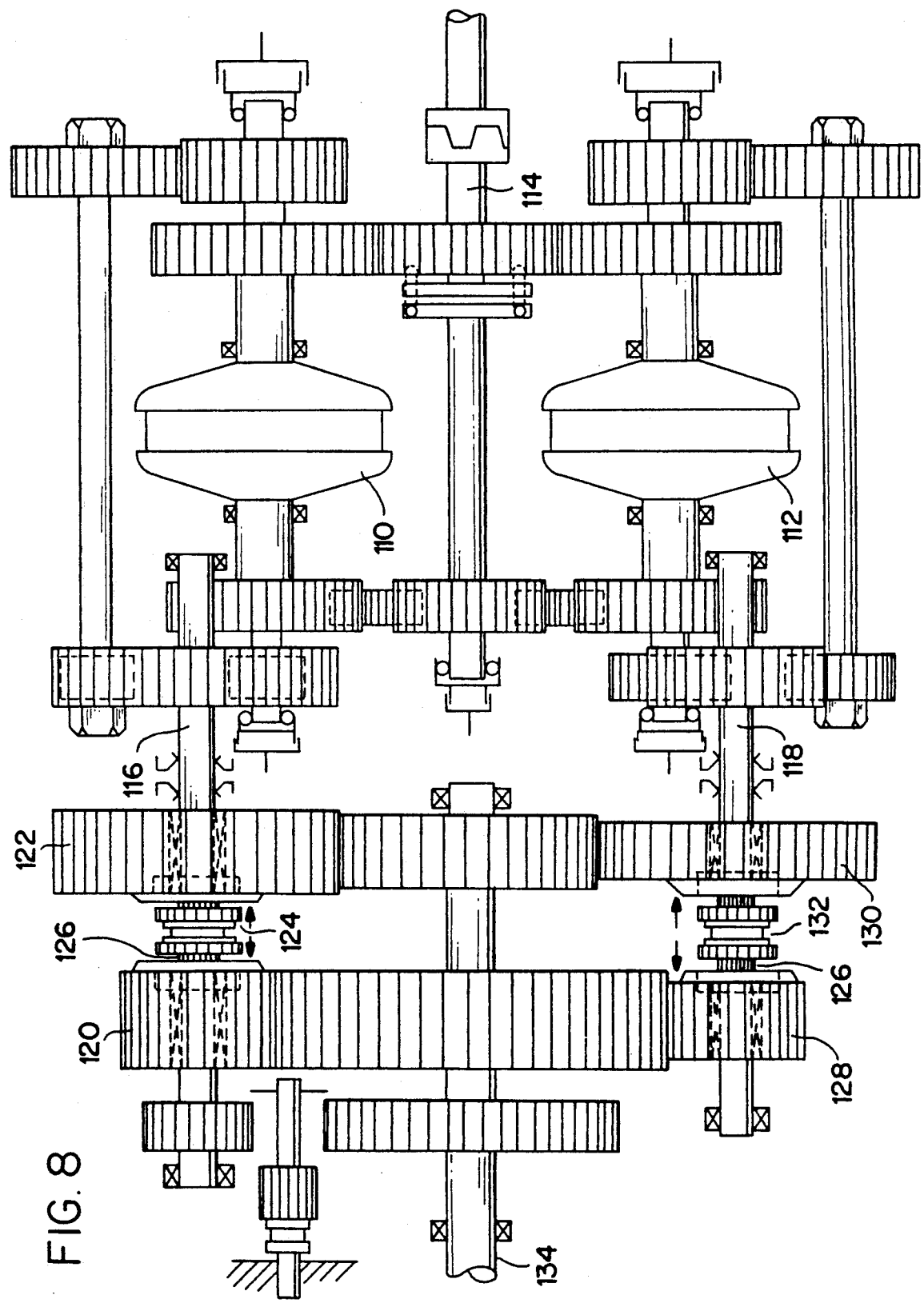
FIG. 8 illustrates schematically a practical transmission including two transmission units of FIG. 6.

The layout of a complete transmission according to the invention is shown in FIG. 8. The transmission includes identical first and second continuously variable transmission units 110 and 112 as described above. Note that, for clarity, the transmission units 110 and 112 are shown as having opposed output shafts extending on either side of the units, in contrast with the arrangment shown in FIG. 6, where concentric output shafts 74 and 76 are shown. The arrangement of FIG. 6 is more compact, but the arrangement in FIG. 8 is easier to follow. The transmission units 110 and 112 are arranged to be driven from a common input shaft 114, and drive respective first and second intermediate output shafts 116 and 118. The shaft 118 is driven via different ratio gearing from the shaft 116, so that it rotates at a speed which is 1,5 times higher than that of the shaft 116. This corresponds to the ratio range of the transmission units 110 and 112.

On the shaft 116 are disposed first and second pinions 120 and 122, which can rotate freely about the shaft 116. A selector unit 124 is engaged with splines 126 on the shaft 116 and is slidable axially on the shaft by a selector fork (not shown). Similarly, pinions 128 and 130 are disposed on the shaft 118, and can be selected by means of a selector unit 132. Depending on which of the pinions 120, 122, 128 and 130 is selected, the drive will be passed from the intermediate output shaft 116 or 118 to a final output shaft 134 via respective output pinions 136 and 138. It will be apparent that the transmission ratio between the input shaft 114 and the output shaft 134 will depend on the drive ratio of the transmission unit 110 or 112 which is engaged, and which of the pinions 120, 122, 128 or 130 is engaged with the pinions 136 or 138. The pinions 122 and 130 have a ratio with the pinion 138 which is a factor $1,5^2$ or 2,25 greater than that of the pinions 120 or 128 with the pinion 136.

It is intended that one of the pinions 120, 122, 128 or 130 be selected as the associated transmission unit 110 or 112 reaches the limit of its transmission ratio range. Because this range corresponds to the ratio between the speeds of the intermediate output shafts 116 and 118, drive can be transferred from the pinions 120 or 122 to the pinions 128 or 130, or vice versa, without any further synchronization being necessary. It can be noted that as drive is transferred from one transmission unit to the other, there is a momentary overlap period when both units are engaged, the respective units being at the top and bottom of their ratio ranges. If the selection of the various pinions 120, 122, 128 and 130 is arranged to occur automatically, a steplessly variable transmission can be obtained which has a transmission range which is considerably greater than that of a single transmission unit 110 or 112 alone. For example, the illustrated transmission system, using two transmission units 110 and 112, each providing a transmission ratio range of 1,5:1, can provide an overall range of $1,5^4 = 5,0625$. This is more than adequate, for example, for passenger vehicle applications.

The transmission system of the invention is preferably used in conjunction with a control system which continuously adjusts the overall transmission ratio of, for example, a motor vehicle in accordance with predetermined criteria. For example, it can be calculated that, for a given throttle opening, an internal combustion engine is most efficient at a particular engine speed. The control system can be calibrated to vary the effective transmission ratio in order to maintain the engine speed constant as the load on the engine varies. If, for example, the accelerator were to be depressed further, a different engine speed would be selected, and the transmission would adjust its ratio accordingly. Thus, fully automatic operation of the vehicle is obtained, it being necessary only to provide a manual clutch for starting off and stopping. Even the manual clutch can be dispensed with and replaced with an automatic coupling, although this will, of course, reduce the overall efficiency of the system. The control system for the transmission may be operated, for example, electrically, hydraulically or mechanically. The preferred solution will depend largely on the cost and reliability of the control system.

I claim:

1. A variable ratio transmission unit including at least one first transmission element mounted for rotation about a first axis, and at least one second transmission element in contact with the first transmission element and mounted for rotation about a second axis which defines a predetermined angle with the first axis, the second transmission element being axially slidable along the second axis to vary the distance between the point of contact of the transmission elements and the first axis, thereby to vary the effective transmission ratio, the first and second transmission elements being provided with complementary profiled faces so that the common tangent with respect to the profiles of the transmission elements at the point of contact between the transmission elements passes through the point of intersection of the first and second axes irrespective of the axial position of the second transmission element, relative movement between the transmission elements being substantially rolling movement.

2. A transmission unit according to claim 1, wherein the first and second axes are orthogonal.

3. A transmission unit according to claim 1, wherein the first transmission element is generally disc shaped, with a profiled contact face on one major surface thereof, the second transmission element being generally cylindrical and having a complementary profiled contact face on its periphery.

4. A transmission unit according to claim 3, wherein a plurality of the second transmission elements are disposed adjacent to the first transmission element and spaced radially about the first axis, each of said plurality of second transmission elements being in driving engagement with a further common transmission element.

5. A transmission unit according to claim 4, wherein each of said plurality of second transmission elements is arranged to be driven by a respective pinion, the common transmission element having a ring gear which drives the pinions.

6. A transmission unit according to claim 5, wherein each of said plurality of second transmission elements is fixed to a splined shaft, on which is axially slidable a respective pinion, so that the second element can be displaced radially relative to the first axis of the transmission unit while the radial position of the pinion remains constant.

7. A transmission unit according to claim 6, wherein each splined shaft is carried by a follower which is mounted in an adjusting mechanism, the adjusting mechanism being operable to vary the radial position of the follower and thus of the second transmission element relative to the first axis in response to a control signal.

8. A transmission unit according to claim 7, wherein the adjusting mechanism comprises a pair of annular plates arranged concentrically about the first axis adjacent to the first transmission element, opposed faces of the annular plates defining inclined slots in which respective followers are received, adjusting means being provided to rotate the plates relative to the first axis, thereby to cause radial movement of the followers relative to the first axis.

9. A transmission unit according to claim 4, wherein a pair of first transmission elements are disposed opposite one another, with one of the plurality of second transmission elements disposed therebetween in driving engagement with both first transmission elements.

10. A transmission unit according to claim 9, wherein a torque sensing means is provided which provides an output signal related to the input torque to the transmission unit, and bias means responsive to the output signal is provided to urge the two first transmission elements together with a force related to the magnitude of the input torque.

11. A transmission unit according to claim 9, wherein each of said pair of first transmission elements is connected to a respective intermediate output shaft, the two intermediate output shafts counterrotating with respect to each other, one intermediate output shaft being connected via a reversing idler to a common main output shaft and the other intermediate output shaft being connected directly to the main output shaft.

12. A variable ratio transmission unit including at least one first transmission element mounted for rotation about a first axis, and at least one second transmission element in contact with the first transmission element and mounted for rotation about a second axis which defines a predetermined angle with the first axis, the second transmission element being axially slidable along the second axis to vary the distance between the point of contact of the transmission elements and the first axis, thereby to vary the effective transmission ratio, the first and second transmission elements being provided with complementary profiled faces so that the common tangent with respect to the profiles of the transmission elements at the point of contact between the transmission elements passes through the point of intersection of the first and second axes irrespective of the axial position of the second transmission element, relative movement between the transmission elements being substantially rolling movement, wherein the transmission unit is driven by an internal combustion engine, a control signal being derived from an engine throttle setting or an equivalent setting and from a predetermined relationship between engine speed and throttle setting, so that the control signal causes the position of the second transmission element to be adjusted to maintain a substantially constant engine speed for a given throttle setting, independent of the output load on the transmission.

13. A transmission for a vehicle comprising first and second transmission units, each transmission unit including at least one first transmission element mounted for rotation about a first axis, and at least one second transmission element in contact with the first transmission element and mounted for rotation about a second axis which defines a predetermined angle with the first axis, the second transmission element being axially slidable along the second axis to vary the distance between the point of contact of the transmission elements and the first axis, thereby to vary the effective transmission ratio, the first and second transmission elements being provided with complementary profiled faces so that the common tangent with respect to the profiles of the transmission elements at the point of contact between the transmission elements passes through the point of intersection of the first and second axes irrespective of the axial position of the second transmission element, relative movement between the transmission elements being substantially rolling movement, the transmission units being arranged to be driven from a common input shaft, the outputs of the transmission units being passed to respective first and second intermediate output shafts, the second intermediate output shaft being arranged to rotate at a speed which is higher than that of the first intermediate output shaft by a factor equal to the ratio range of the transmission units, drive from one or the other of the intermediate output shafts being transmitted to a final output shaft via ones of a plurality of selectively engageable pinions associated with each intermediate output shaft.

14. A transmission for a vehicle according to claim 13 wherein a pair of pinions of different sizes is mounted on each intermediate output shaft and a selector is provided which engages the shaft and is slidable axially thereon to engage one or the other of the pinions.

15. A transmission for a vehicle according to claim 13 including means for controlling the operation of the transmission automatically so that drive is transferred from one intermediate output shaft to the other as the respective transmission unit reaches the limit of its ratio range, so that a steplessly variable drive is obtained over a ratio range which is greater than that of either of the transmission units alone.

* * * * *